(12) United States Patent
Sellers

(10) Patent No.: US 10,986,129 B1
(45) Date of Patent: Apr. 20, 2021

(54) LIVE DEPLOYMENT OF DECEPTION SYSTEMS

(71) Applicant: Rapid7, Inc., Boston, MA (US)

(72) Inventor: Thomas Eugene Sellers, Georgetown, TX (US)

(73) Assignee: Rapid7, Inc., Boston, MA (US)

( * ) Notice: Subject to any disclaimer, the term of this patent is extended or adjusted under 35 U.S.C. 154(b) by 118 days.

(21) Appl. No.: 16/435,742

(22) Filed: Jun. 10, 2019

Related U.S. Application Data

(63) Continuation of application No. 16/367,359, filed on Mar. 28, 2019.

(51) Int. Cl.
*H04L 29/06* (2006.01)

(52) U.S. Cl.
CPC ...... *H04L 63/1491* (2013.01); *H04L 63/1416* (2013.01)

(58) Field of Classification Search
CPC .......................... H04L 63/1491; H04L 63/1416
USPC ............................................................. 726/22
See application file for complete search history.

(56) References Cited

U.S. PATENT DOCUMENTS

| | | | | |
|---|---|---|---|---|
| 10,110,629 | B1 * | 10/2018 | Kruse ................. | H04L 63/0236 |
| 2006/0161982 | A1 * | 7/2006 | Chari ..................... | G06F 21/53 726/23 |
| 2015/0121529 | A1 * | 4/2015 | Quinlan .................. | H04L 67/28 726/23 |
| 2017/0223052 | A1 * | 8/2017 | Stutz .................... | H04L 63/1433 |
| 2018/0159701 | A1 * | 6/2018 | Krause ................ | H04L 61/2514 |
| 2019/0132359 | A1 * | 5/2019 | Kraenzel ............... | G06F 16/951 |

\* cited by examiner

*Primary Examiner* — Michael S McNally
(74) *Attorney, Agent, or Firm* — Ashwin Anand

(57) ABSTRACT

Disclosed herein are methods, systems, and processes to perform live deployment of deception computing systems. An imminent or ongoing malicious attack on a protected host in a network is detected. In response to detecting the imminent or ongoing malicious attack, personality characteristics of the protected host are cloned and a honeypot clone based on the personality characteristics is generated. The honeypot clone is then deployed in the network. A determination is made that the malicious attack includes an interactive session between an attacker associated with the malicious attack and the protected host, and a live state transition is performed between the protected host and the honeypot clone using agent data if the interactive session includes an encrypted protocol or using session state data if the interactive session does not include the encrypted protocol. Attacker data traffic associated with the malicious attack is redirected from the protected host to the honeypot clone and the interactive session is resumed if the redirection of the attacker traffic data transitions within a predetermined time period.

4 Claims, 9 Drawing Sheets

US 10,986,129 B1

LIVE DEPLOYMENT OF DECEPTION SYSTEMS

CROSS-REFERENCE TO RELATED APPLICATIONS

The present application claims the benefit of and is a continuation of pending U.S. patent application Ser. No. 16/367,359 titled "Live Deployment of Deception Systems" and filed on Mar. 28, 2019, the disclosure of which is incorporated by reference as if set forth in its entirety herein.

BACKGROUND

Field of the Disclosure

This disclosure is related to deception systems implemented in cybersecurity computing environments. In particular, this disclosure is related to the live deployment and provisioning of decoy deception systems.

Description of the Related Art

A honeypot is a physical or virtual computing system implemented in a network as a decoy to lure malicious actors (e.g., hackers) in an attempt to detect, deflect, and/or study hacking attempts. Such a deception system can be configured as an enticing target for attackers (e.g., as a high-value server) and can be used to gather valuable attack telemetry data (e.g., identity of attackers, attack mechanism(s) used, targets sought, and the like). Therefore, honeypots are implemented in modern cybersecurity computing environments to identify and defend (against) attacks from advanced persistent threat actors.

Malicious attackers target protected hosts. Hence, it can be beneficial to replace a targeted host with a honeypot while still retaining the ability to gain attack telemetry data during an imminent or ongoing attack. Unfortunately, ensuring that the attacker does not become aware of this covert switch and continues to engage with the honeypot while being under the impression that they are interacting with the targeted host presents a technological challenge.

SUMMARY OF THE DISCLOSURE

Disclosed herein are methods, systems, and processes to perform live deployment of deception systems (e.g., honeypots). One such method involves detecting a malicious attack on a protected host in a network that is imminent or ongoing, cloning personality characteristics of the protected host in response to the detecting that the malicious attack is imminent or ongoing. generating a honeypot clone based on the personality characteristics, and deploying the honeypot clone in the network.

In one embodiment, the method involves determining that the malicious attack includes an interactive session between an attacker associated with the malicious attack and the protected host and performing a live state transition between the protected host and the honeypot clone using agent data if the interactive session comprises an encrypted protocol or using session state data if the interactive session does not comprise the encrypted protocol.

In another embodiment, the method involves redirecting attacker data traffic associated with the malicious attack from the protected host to the honeypot clone and resuming the interactive session if the redirection of the attacker traffic data transitions within a predetermined time period.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings and/or figures.

Figure 1:
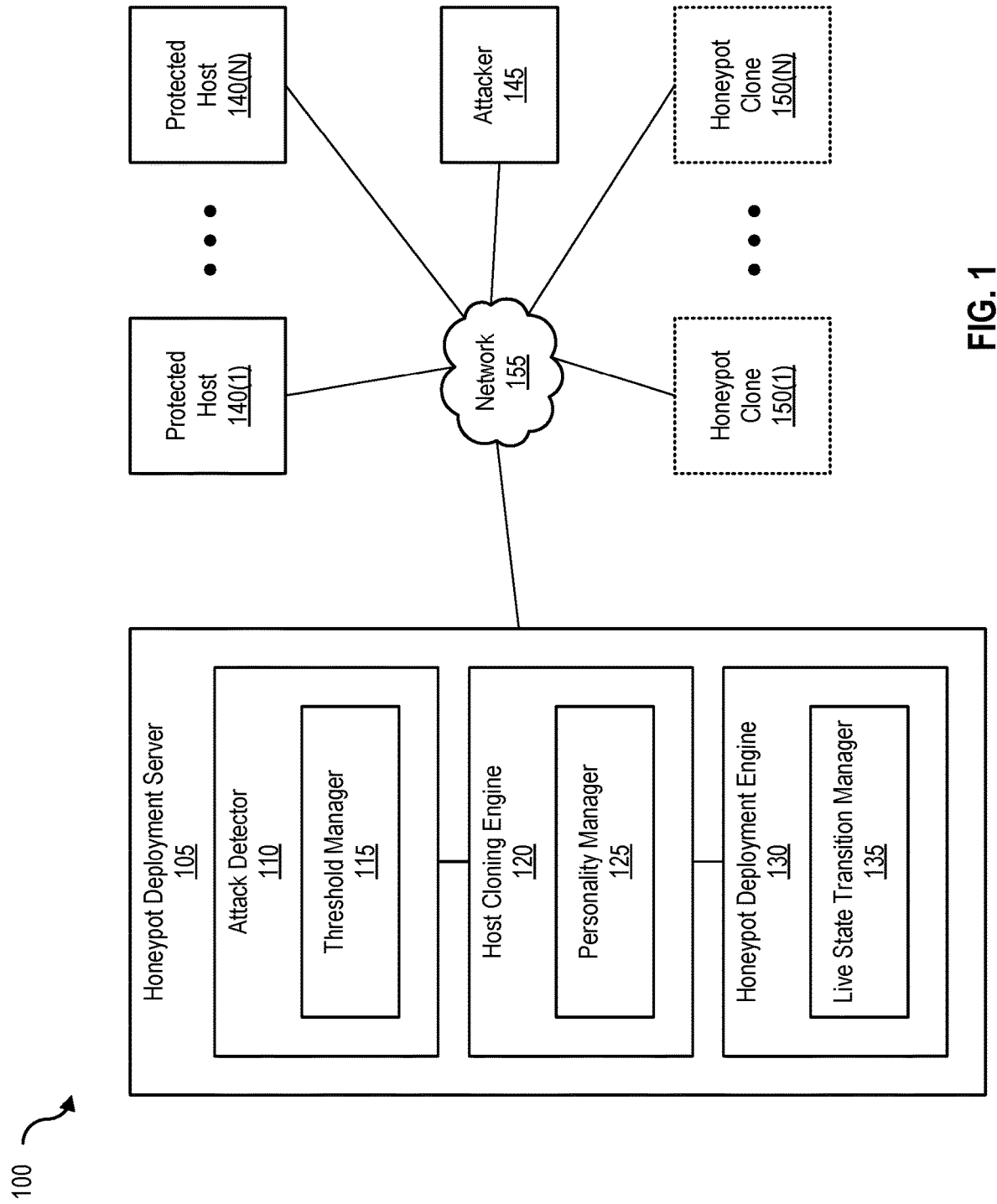
FIG. 1 is a block diagram 100 of a honeypot deployment server, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Malicious attackers (e.g., hackers, rogue government entities, and the like) typically target high-value protected hosts (e.g., production systems, web servers, e-commerce servers, employee database servers, and the like). Given the cyber threat, modern companies typically implement cybersecurity measures to safeguard protected hosts from malicious attack (e.g., in the form of cybersecurity software, systems, and solutions). Typically, when an attack is detected, cybersecurity measures kick in and the protected host is shielded from the attacker (e.g., shutdown, disabled, taken off the network, and the like).

Honeypots are decoy deception computing systems (physical or virtual). Honeypots can be configured to mirror and mimic protected hosts and can be used to covertly divert an attacker from an intended target as well as gain valuable attack telemetry data about the attacker and the attack itself. Cybersecurity computing environments that implement honeypots typically have a ratio of honeypots to protected hosts (e.g., 1 honeypot for every 50 protected hosts). Therefore, although a honeypot can superficially mimic any one of several protected hosts (e.g., based on a host name or other identifiers), in the vast majority of situations, a honeypot cannot readily function as a dedicated high fidelity copy of the protected host. In other words, it is a technological challenge to provision honeypots with the same or substantially the same "personality" as a protected host such that a potential (and sophisticated) attacker who attacks the protected host is deceived into thinking that a replacement honeypot (e.g., a cloned decoy) that is swapped for the protected host is actually the intended (target) protected host.

For example, if an attacker scans a honeypot (e.g., using Nmap), the honeypot should return the identifying information or metadata associated with a protected host (e.g., particularly if the attacker has (or had) previously interacted with the protected host). The honeypot, when queried by an attacker who thinks the honeypot is a protected host that they previously interacted with or wants to interact with, must return information such as host names, work groups, services, software versions, etc. that matches the information that would have been (and may have previously been) provided by the protected host. If the honeypot is unable to do so, a sophisticated attacker can determine that they are no longer interacting with the protected host.

Successfully deploying a high fidelity honeypot clone presents several technology related challenges, particularly in situations where such a honeypot needs to be spun up as a protected host replacement in a short amount of time (e.g., if a malicious attack is imminent or is already underway). For example, depending on the protocol (e.g., various storage, network, communication, and/or encrypted protocols), honeypots permit (or are limited to) varying levels of interaction (e.g., with an outside system). Therefore, because the fidelity of a replacement honeypot depends directly on the complexity of a protected host the honeypot is replacing, protocol incompatibilities can prove a difficult barrier to overcome, particularly in situations where such replacement has to be performed in a short amount of time.

Given the foregoing concerns, at least two capabilities are essential if honeypots are to be successfully deployed "live" in such cybersecurity computing environments. First, the switching or diversion of an attacker's network traffic flow from a protected host to a honeypot has to be performed in a seamless manner such that the attacker does not realize or notice the switch from the protected host to the honeypot. Second, when the attacker resumes interaction with what they think is the protected host, the decoy replacement honeypot must be able to successfully mimic the protected host so that that the attacker does not discover that they have been deceived into interacting with the honeypot instead of the protected host.

Unfortunately, existing systems and methodologies that redirect malicious network traffic to honeypots do so in a manner that does not (or cannot) ensure that an attacker attacks or continues to attack a specific computing system (e.g., a particular desired and targeted protected host). In addition, revelation or exposure of a deception system means that attack telemetry data about the attacker and the attack is not generated (or cannot continue to be generated). Therefore, the entire defensive cybersecurity ecosystem suffers when honeypots are not able to effectively conceal their identity and mimic a protected host in a seamless and high-fidelity manner that can ensure that the collection of attack telemetry data continues uninterrupted.

Disclosed herein are methods, systems, and processes to perform live deployment of deception systems by redirecting an attacker's network traffic to a honeypot that mimics the attacker's intended target with a (high enough) level of fidelity that can help ensure that the attacker is unaware and continues the attack (against a specific computing system).

Example Honeypot Deployment Server

FIG. 1 is a block diagram 100 of a honeypot deployment server 105, according to one embodiment. Honeypot deployment server 105 includes at least an attack detector with a threshold manager 115, a host cloning engine 120 with a personality manager 125, and a honeypot deployment engine 130 with a live state transition manager 135. Honeypot deployment server 105 can include any type of physical or virtual computing device or system. Honeypot deployment server 105 is communicatively coupled to protected hosts 140(1)-(N) and honeypot clones 150(1)-(N) via network 155, which can be any type of network or interconnection. Protected hosts 140(1)-(N) and honeypot clones 150(1)-(N) can include any type of physical or virtual computing devices or systems. As shown in FIG. 1, an attacker 145 initiates a malicious attack on one or more protected hosts 140(1)-(N) in network 155. For example, the malicious attack can include, but are not limited to, one or more of Ransomware, man-in-the-middle, worm, Trojan, denial of service, Ping flood, Ping of death, Smurf, Port scan, Idle scan, buffer overflow, heap overflow, stack overflow, or format string attack.

In one embodiment, attack detector 110 detects that a malicious attack on protected host 140(1) is imminent or ongoing. Threshold manager 115 can indicate whether an attack threshold has been met or exceeded (e.g., based on one or more metrics such as how often a protected host has been contacted, the location from which contact is made, the information sought, and the like, or from information received from an incident detection system). Once attack detector 110 detects that the malicious attack on protected host 140(1) is imminent or ongoing, host cloning engine 120 clones personality characteristics of protected host 140(1). For example, a personality state table maintained by personality manager 125 can be used to configure honeypot clone 150(1) with one or more personality of characteristics of protected host 140(1) expected by attacker 145, which can include, but is not limited to, a host name, a work group, one or more operating system (OS) services (e.g., a Domain Name System (DNS) client, a firewall, and the like), software version information, banners (e.g., a server banner), and/or one or more protocols used (e.g., a network protocol like Secure Shell (SSH) or a storage protocol like Network File System (NFS)). Therefore, host cloning engine 120 generates honeypot clone 150(1) with personality characteristics of protected host 140(1) and honeypot deployment engine 130 deploys honeypot clone 150(1) in network 155.

As noted, threshold manager 115 can indicate whether an attack threshold has been met or exceeded. Examples of attack threshold metrics include, but are not limited to, an attack complexity, an attack duration, an attacker source location, a protected host target location, an attack vector, or a security exploit. Once honeypot clone 150(1) is provisioned with one or more personality characteristics of protected host 140(1) which honeypot clone 150(1) is replacing, live state transition manager 135 redirects attacker data traffic of attacker 145 from protected host 140(1) to honeypot clone 150(1) and disables protected host 140(1) or (further) access to protected host 140(1) (e.g., by attacker 145).

In some embodiments, honeypot deployment engine 130 deploys honeypot clone 150(1) in a network segment of network 155 with a Media Access Control (MAC) address that is different than protected host 140(1) (or after protected host 140(1) or access to protected host 140(1) has been disabled). Honeypot deployment engine 130 can also modify route tables to redirect attacker data traffic or attacker network flow if honeypot clone 150(1) is not deployed in the (same) network segment as protected host 140(1).

Example Interactive Session Between an Attacker and a Honeypot Clone

Figure 2:
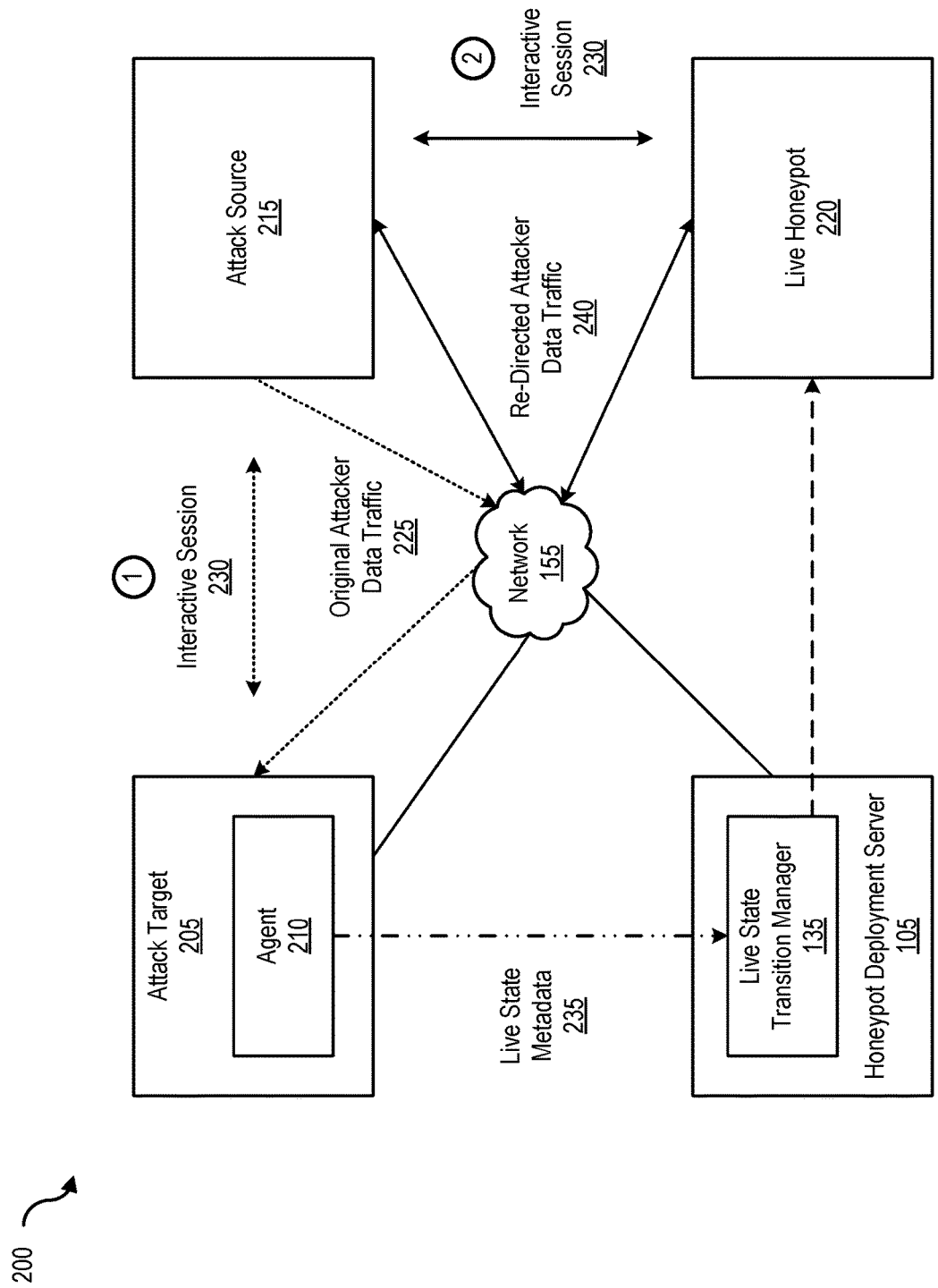
FIG. 2 is a block diagram 200 of an interactive session, according to one embodiment of the present disclosure.

FIG. 2 is a block diagram 200 of an interactive session, according to one embodiment. A malicious attack from an attack source 215 (e.g., attacker 145) that is imminent or ongoing is detected (e.g., original attacker data traffic 225). An agent 210 on attack target 205 generates and transmits live state metadata 235 from attack target 205 to live state transition manager 135 in honeypot deployment server 105. In addition to cloning one or more personality characteristics of an attack target 205 (e.g., protected host 140(1)) as discussed above, honeypot deployment server 105 uses live state metadata 235 received from agent 210 to generate a live honeypot 220 with a combination of personality characteristics of attack target 205 (e.g., based on historical data) as well as live state metadata of attack target 205 (e.g., the state of target 205 or protected host 140(1) at the moment of attack or for a period of time immediately preceding the attack). Therefore, because both personality characteristics and live state metadata are used to deploy a live clone, redirected attacker data traffic 240 from attack source 215 can be redirected from attack target 205 to live honeypot 220 (e.g., honeypot clone 150(1)) without attack source 215 realizing that the switch/redirection was made and that live honeypot 220 is not attack target 205.

As previously noted, one risk among many of redirecting attacker data traffic from an intended target to a honeypot is that the attacker will notice the switch and/or will figure out that the replacement honeypot decoy clone is not the intended attack target. Therefore, to ameliorate this risk, honeypot deployment server 105 uses live state metadata 235 collected by agent 210 on attack target 205 to provision live honeypot 220 that now benefits from both the actual personality characteristics of attack target 205 as well as the live state of those characteristics at the moment of attack or immediately prior to the attack—thus improving the probability that attack source 215 will not notice the switch and will continue to believe live honeypot 220 is attack target 205 and continue interacting with live honeypot 220 (involuntarily providing rich and valuable attack telemetry data in the process).

For example, agent 210 has the appropriate visibility of (and rights to) attack target 205 to retrieve a Transport Layer Security (TLS) certificate, information about sessions (e.g., an interactive session 230) and encryption keys. In one embodiment, the TLS certificate is stored in memory in attack target 205. Therefore, agent 210 can access and transfer the TLS certificate as part of live state metadata 235 to live state transition manager 135 so that when attack source 215 continues interactive session 230 with live honeypot 220, live honeypot 220 has the TLS certificate and session keys, and knows the Transfer Control Protocol (TCP) state of attack target 205.

Example of Performing Live State Transition

Figure 3:
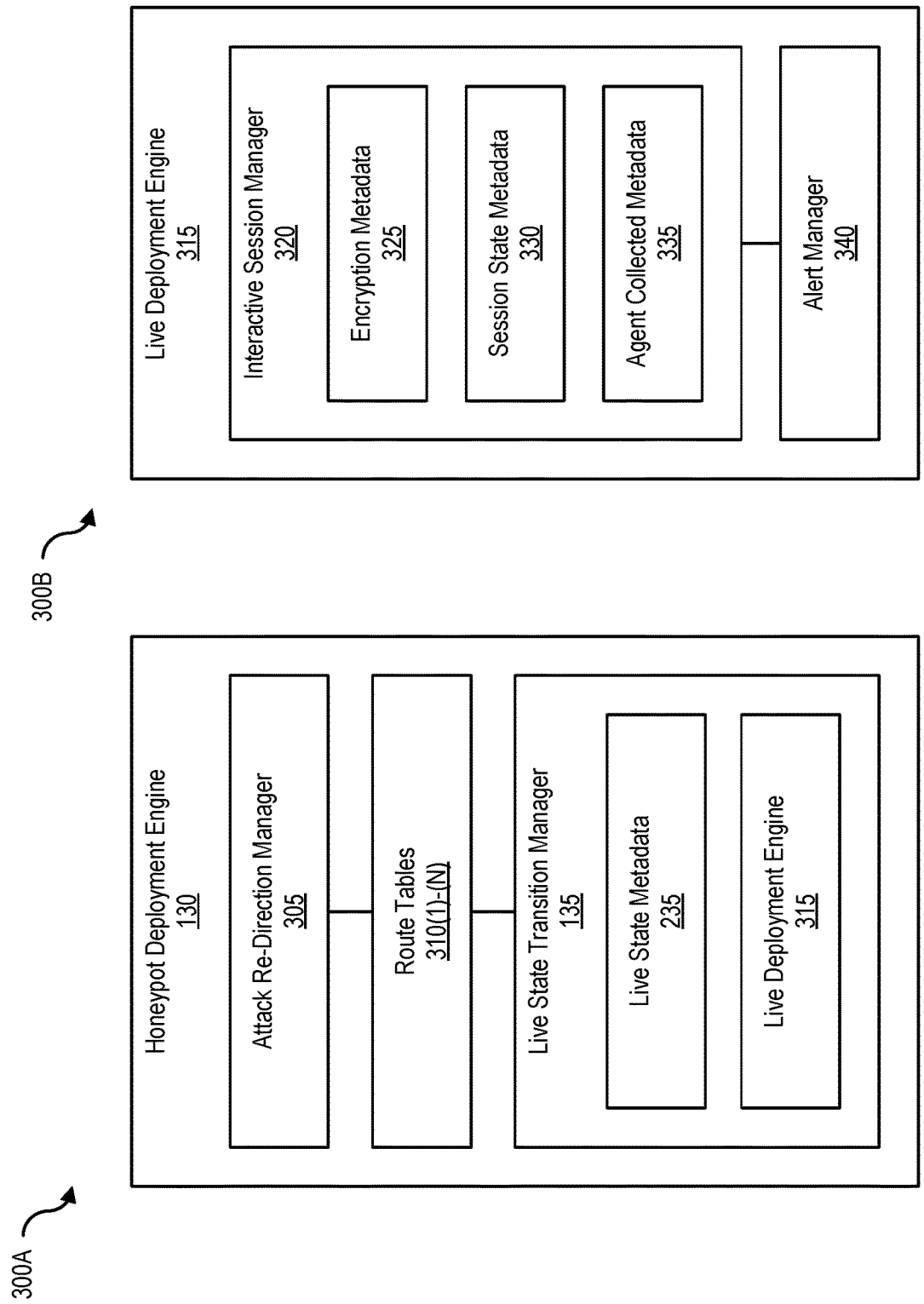
FIG. 3A is a block diagram 300A of a honeypot deployment engine, according to one embodiment of the present disclosure.
FIG. 3B is a block diagram 300B of a live deployment engine, according to one embodiment of the present disclosure.

FIGS. 3A and 3B are block diagrams 300A and 300B of honeypot deployment engine 130 and a live deployment engine 315, respectively, according to some embodiments. Honeypot deployment engine 130 includes, but is not limited to, an attack redirection manager 305, route tables 310(1)-(N), and live state transition manager 125, which further includes live state metadata 235 (as shown in FIG. 2) and a live deployment engine 315. Live deployment engine 315 includes an interactive session manager 320 with encryption metadata 325, session state 330, and agent collected metadata 335, and an alert manager 340. In one embodiment, honeypot deployment engine 130 determines that a malicious attack includes an interactive session between an attacker associated with the malicious attack and the protected host and live deployment engine 315 performs a live state transition between the protected host and the honeypot clone. As noted, live state metadata 235 is necessary for seamless and lossless live state transition.

As shown in FIG. 3B, live state metadata 235 can include at least encryption metadata 325, session state metadata 330, and agent collected metadata 335. Such live state metadata 235 can be maintained and managed by interactive session manager 320 to perform live state transition. For example, network connections that use certain network protocols such as SSH and Telnet or that include connections to a Structured Query Language (SQL) server that requires running commands in SQL, are considered "live" connections. Because such protocols and connections require a socket to be open, dropping original attacker data traffic 225 and switching to redirected attacker data traffic 240 can indicate a network drop—a risk that an attacker will find out that their original intended target has been replaced with a deception system.

Therefore, to perform seamless and lossless live state transition, live state transition manager 135 monitors network 155 to generate network data flow information between the attacker and the protected host (e.g., agent collected metadata 335), accesses TCP session state information (e.g., session state metadata 330), and resumes the interactive session between the attacker and the honeypot clone (e.g., interactive session 230 that is resumed as redirected attacker data traffic 240 as shown in FIG. 2).

In one embodiment, if live deployment engine 315 determines that the live state transition (process) cannot be performed if interactive session 230 between attack source 215 and attack target 205 includes an encrypted protocol, interactive session manager 320 access TCP session state information (e.g., session state metadata 330) and encryption keys associated with interactive session 230 for the encrypted protocol (e.g., encryption metadata 325), and resumes interactive session 230 if the redirection (or switching) of attacker traffic data (e.g., redirected attacker data traffic 240) from attack target 205 to live honeypot 220 transitions within a predetermined time period.

Therefore, live deployment engine 315 can harmonize, among other corollaries, the TCP session state, the counter, and the encryption key between a protected host and a honeypot clone, while doing so in a seamless and lossless manner (e.g., by virtue of having access to on-premise (in-memory) agent collected metadata 335 that collects the "live" state of the protected host at the moment of attack or immediately preceding an attack while accounting for encryption-based incompatibilities, as noted above).

Example Processes for Live Deployment of Deception Systems

Figure 4:
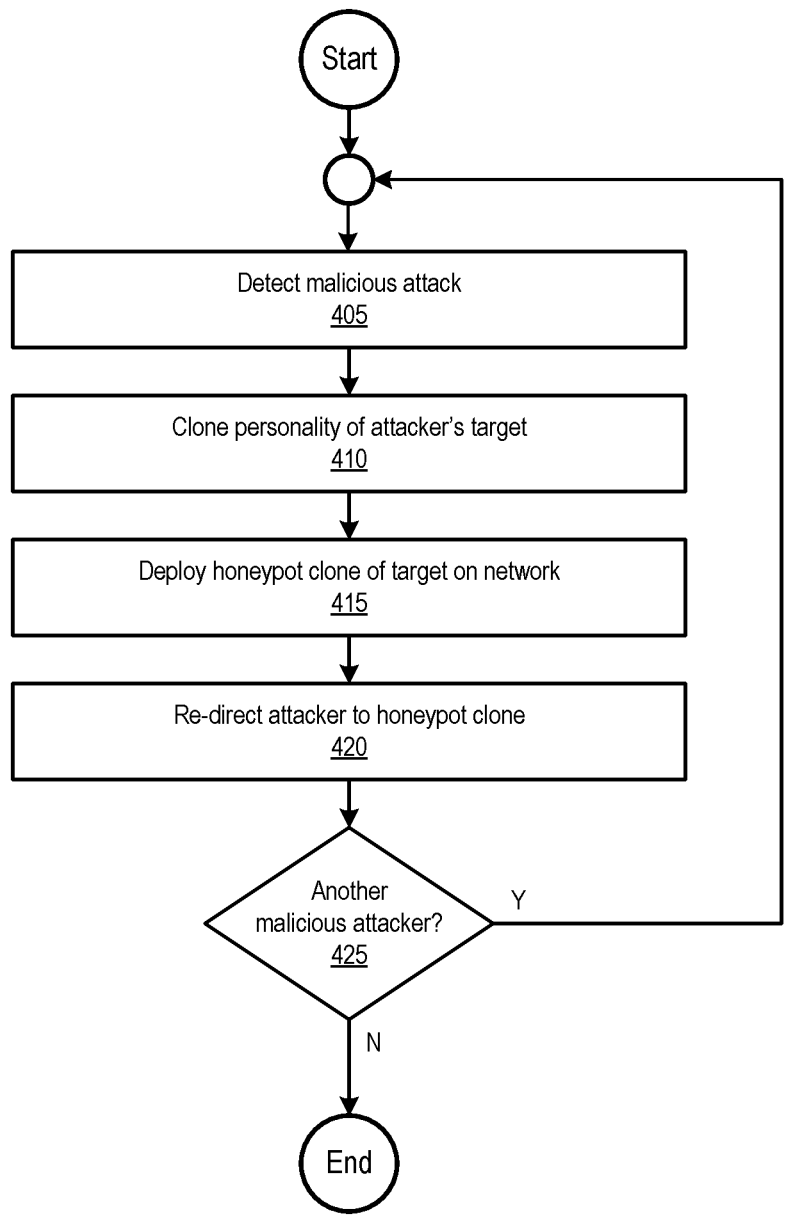
FIG. 4 is a flowchart 400 of a process to redirect an attacker to a honeypot clone, according to one embodiment of the present disclosure.

FIG. 4 is a flowchart 400 of a process to redirect an attacker to a honeypot clone, according to one embodiment. The process begins at 405 by detecting a malicious attack (e.g., using attacker detector 110). The malicious attack can include Ransomware, man-in-the-middle, worm, Trojan, denial of service, Ping flood, Ping of death, Smurf, Port scan, Idle scan, buffer overflow, heap overflow, stack overflow, or format string attack, among other types of malicious attacks. At 410, the process clones the personality of the attacker's target (e.g., a protected host or production system).

In one embodiment, if the protected host or production system was previously targeted by the same attacker, the personality cloning process accesses a personality state table and clones personality characteristics of the target that mimics the state of the target immediately prior to or during the previous attack by the attacker. Such personality characteristics of a protected host expected by the attacker can include, among other characteristics, a host name, a work group, OS services, version information, banners, and protocol information. For example, live state cloning can include the "Stack" (e.g., states of a link support layer, a network layer, and a transport layer) as well as the state of network/storage below and application(s) above. In another embodiment, if the protected host or production system was not previously targeted by the same attacker, the personality cloning process, at the minimum, clones the banner(s) of the protected host.

At 415, the process deploys a honeypot clone of the target on the network. In one embodiment, the honeypot clone of the target is deployed on the network while a malicious attack on the target protected host is imminent or ongoing. At 420, the process redirects the attacker to the honeypot clone (e.g., by performing live state transition based on the cloned personality characteristics of the protected host). Because honeypot deployment server 105 knows the TCP state, the encryption state, and the application state of the protected host (e.g., via a personality source or direct interrogation), honeypot deployment server 105 can provision a high fidelity honeypot clone that can deceive the attacker into thinking that they are interacting with the protected host after live state transition from the protected host to the honeypot clone. At 425, the process determines if there is another malicious attacker. If there is another malicious attacker, the process loops to 405. Otherwise, the process ends.

Figure 5:
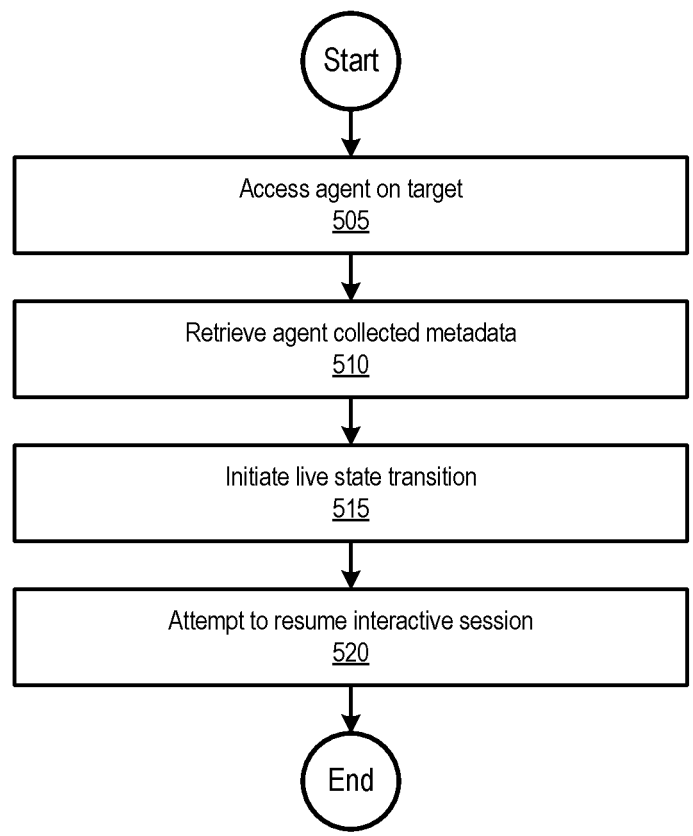
FIG. 5 is a flowchart 500 of a process to perform live state transition, according to one embodiment of the present disclosure.

FIG. 5 is a flowchart 500 of a process to perform live state transition, according to one embodiment. The process begins at 505 by accessing an agent on a target (e.g., agent 210 on attack target 205 as shown in FIG. 2). In one embodiment, agent 210 is installed on attack target 205 and is configured to collect live state metadata 235 if attack target 205 has been subject to previous malicious attacks (or malicious attack attempts) from attack source 215 or one or more computing systems or IP addresses associated with attack source 215.

At 510, the process retrieves agent collected metadata (e.g., live state metadata 235). In one embodiment, the agent collected metadata includes encryption keys of one or more sessions between attack source 215 and attack target 205 collected as part of an imminent or ongoing attack (e.g., as part of a first iteration of interactive session 230 (shown with a dotted line in FIG. 2)). In one embodiment, comparison between previously collected live state metadata (e.g., live state metadata related to a previous interaction between attack source 215 and attack target 205 and maintained in a personality state table) and the currently collected live state metadata can indicate whether one or more personality characteristics of live honeypot 220 have to be changed, modified, updated, removed, or added prior to the live state transition and as part of cloning attack target 205 as live honeypot 220. In this manner, if attack source 215 has previously interacted with attack target 205, live honeypot 220 can be provisioned and deployed to match the expectation(s) of attack source and can aid in collecting fresh/new attack telemetry data from the attacker.

At 515, upon adequately and appropriately provisioning live honeypot 220, the process initiates (a) live state transition (operation) to redirect attacker data traffic and network flow from (the intended) attack source 215 to live honeypot 220. The process ends at 520 by attempting to resume the interactive session. Because the expiration of too much time during live state transition and resumption of the interactive session (e.g., a 45 second gap) can indicate to a sophisticated attacker that the attack target is being replaced with a honeypot, in one embodiment, a software agent pre-deployed on the attack target collects information about the (current) session such as TCP session information, session encryption keys for encrypted protocols, and the like, and then resumes the interactive session if the transition occurs (and/or can be performed/effectuated) within a specified period of time (e.g., within a threshold of 10 seconds—a threshold that can be increased or decreased based on the sophistication of the attacker, derived or determined, for example, during one or more previous interactions with the (same) attacker).

Figure 6:
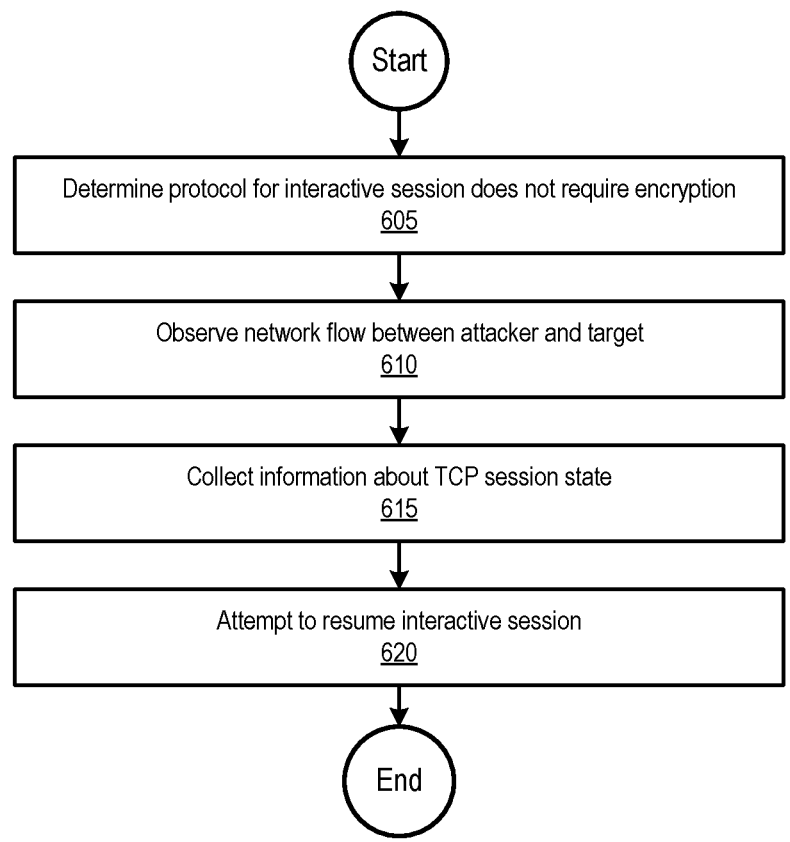
FIG. 6 is a flowchart 600 of a process to perform live state transition, according to one embodiment of the present disclosure.

FIG. 6 is a flowchart 600 of a process to perform live state transition, according to one embodiment. The process begins at 605 by determining that the protocol being used for the current interactive session between an attacker and an attack target does not require encryption. For example, under certain network communication protocols, encryption certificates are only used to establish a secure means of communication between two parties while a separate (faster) encryption key is used to actually encrypt communications. In such cases, and at 610, the process observes network flow between the attacker and the target, and at 615, collects information about the TCP session state. The process ends at 620 by attempting to resume the interactive session. In some embodiments, steps 610, 615, and 620 are similar to hijacking a TCP connection.

Figure 7:
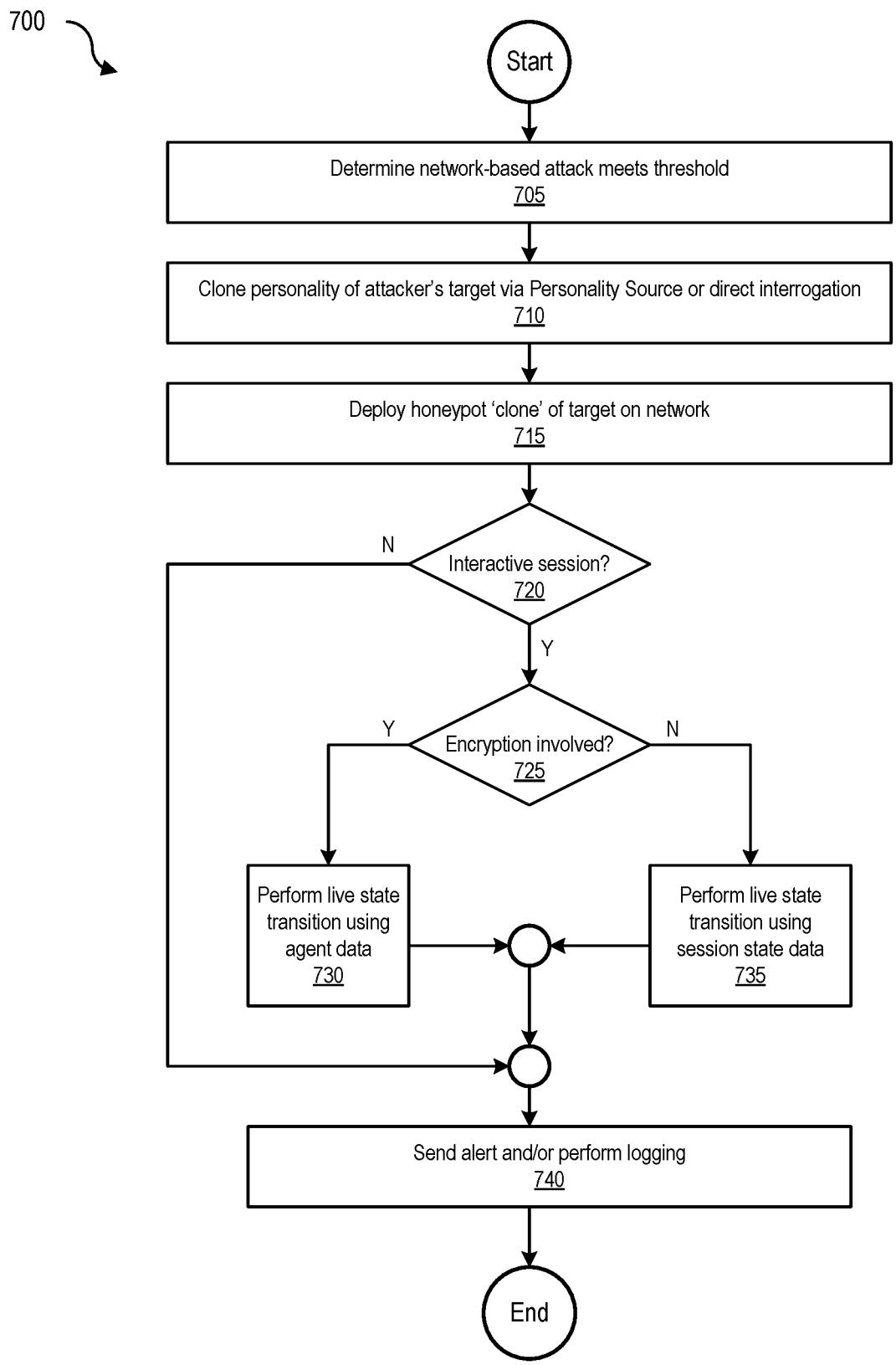
FIG. 7 is a flowchart 700 of a process to perform live state transition, according to one embodiment of the present disclosure.

FIG. 7 is a flowchart 700 of a process to perform live state transition, according to one embodiment. The process begins at 705 by determining that a network-based attack meets a threshold (e.g., based on, among other metrics, attack complexity, attack duration, attacker source location, protected host target location, attack vector, or security exploit). At 710, the process clones the personality of the attacker's target (e.g., via a Personality Source like a personality state table or via direct interrogation). In one embodiment, the personality characteristics for cloning the target can be retrieved from a personality source such as a personality state table, previously collected live state metadata (e.g., previous interaction details between the attacker and the target that was collected but not used to provision a live honeypot) or currently available live state metadata (e.g., collected by an agent). At 715, the process deploys the honeypot clone of the target on the network.

At 720, the process determines whether there is an interactive session. If there is no interactive session, the process ends at 740 by sending an alert and/or performing logging. However, if there is an interactive session (ongoing between the attacker and the target), the process, at 725, determines whether there is encryption involved. If there is encryption involved, the process, at 730, performs live state transition using agent data. For example, because encryption certificates (used to certify an interactive session) are stored locally in memory of attack target 205, agent 210 can retrieve the certificate information and transmit the certificate information to honeypot deployment server 105 as live state metadata 235. Live state transition manager 135 can supplement preexisting personality characteristics with the newly-retrieved certificate information to generate live honeypot 220 (as shown in FIG. 2).

However, if there is no encryption involved, the process, at 735, performs live state transition using session state data. Similar to hijacking a TCP connection, and for limited protocols such as those not involving encryption, honeypot deployment server 105 can observe the network flow between the attacker and the target and collect TCP session state information for live state transition. After performance of live state transition under either scenario (730 or 735), the process ends at 740 by sending an alert and/or performing logging (as appropriate).

Examples of Performing Seamless and Lossless Live State Transfer (LST)

As previously noted, honeypot deployment server 105 can perform seamless and lossless live state transfer (LST). Lossless LST involves a comparison between current live state information and past state information associated with a current attack and a previous attack (if there is one), respectively, and the encryption information of a current interactive session (e.g., encryption certificates, session keys, and the like) so that no state information is "lost" once attacker traffic is redirected to a live honeypot clone. Because live state transition has to be performed within a short amount of time (e.g., 10 seconds) to prevent an attacker from determining that their target is being switched with a honeypot, the urgency of retrieving this state session information is important for effectuating LST (and subsequent redirection of network traffic). Therefore, it will be appreciated that honeypot deployment server 105 can perform seamless and lossless LST using the systems, methods, and processes described herein.

While existing mechanisms can redirect attacker traffic to a honeypot, these mechanisms cannot convince an attacker that they are attacking or continuing to attack a specific system. For example, although a virtual machine can be pre-provisioned with one or more personality characteristics of a protected host, such pre-provisioning does not account for encryption information and TCP state information (e.g., live state metadata) and therefore cannot product a high fidelity copy of the attack target. In addition, because such pre-provisioning does not include the current encryption keys being used to facilitate an interactive session between the attacker and the target, a sophisticated attacker can determine that the replacement live honeypot is not the protected host that they are attacking or previously attacked. Malicious attackers desire encryption information to further delve into a network vertically without expending further effort. Unfortunately, existing mechanisms do not permit optimal attack telemetry data gathering.

In one embodiment, to provision a high fidelity live honeypot clone, honeypot deployment server 105 compares previously captured live state metadata (e.g., the state of a protected host or attack target during or prior to a previous malicious attack) and current live state metadata captured by an agent (e.g., the live state of a protected host during an ongoing malicious attack or prior to an imminent malicious attack). Results of the foregoing comparison are stored in a cache on honeypot deployment server 105 and permit live state transition manager 135 to supplement agent collected metadata 335 not only with encryption metadata 325, but also with modifications to one or more personality characteristics of the protected host. For example, if the protected host was provisioned with NFS during a previous attack and now uses a different storage protocol, live state transition manager 135 can determine that the storage protocol has changed between attacks and can provision the live honeypot clone with a different storage protocol (e.g., a currently-used storage protocol or a storage protocol different than NFS). In this manner, live state transition manager 135 can minimize the risk that the live honeypot clone will be outed as such and can facilitate the continued gathering of valuable attack telemetry data.

In one embodiment, based on the sophistication of the attacker (e.g., based on whether the attacker is a repeat offender, past attack telemetry data, and the like), honeypot deployment server 105 generates an incident point urgency (IPU). The IPU quantifies how quickly live state metadata 235 needs to be transmitted from attack target 205 to honeypot deployment server 105 in order to successfully effectuate LST (e.g., the maximum time available). Because important session related encryption keys and certificates need to be retrieved quickly from an on-premise agent on the attack target and transmitted to honeypot deployment server 105, time is of the essence (e.g., to minimize the live state transition time to avoid alerting the attack of the switch). Therefore, to facilitate rapid live state transition that is dependent on encryption information that has been recently generated (e.g., between the attack target and the attack source) and is only valid for a finite period of time (e.g., during the attack), live state transition manager 135 generates an encryption exchange instance (EEI) that communicates exclusively with agent 210 to request and retrieve live state metadata 235.

Therefore, the methods, systems, and processes disclosed herein perform live deployment of deception systems by redirecting an attacker's network traffic to a honeypot clone that accurately mimics the attacker's intended target with a high level of fidelity.

Example Computing Environment

Figure 8:
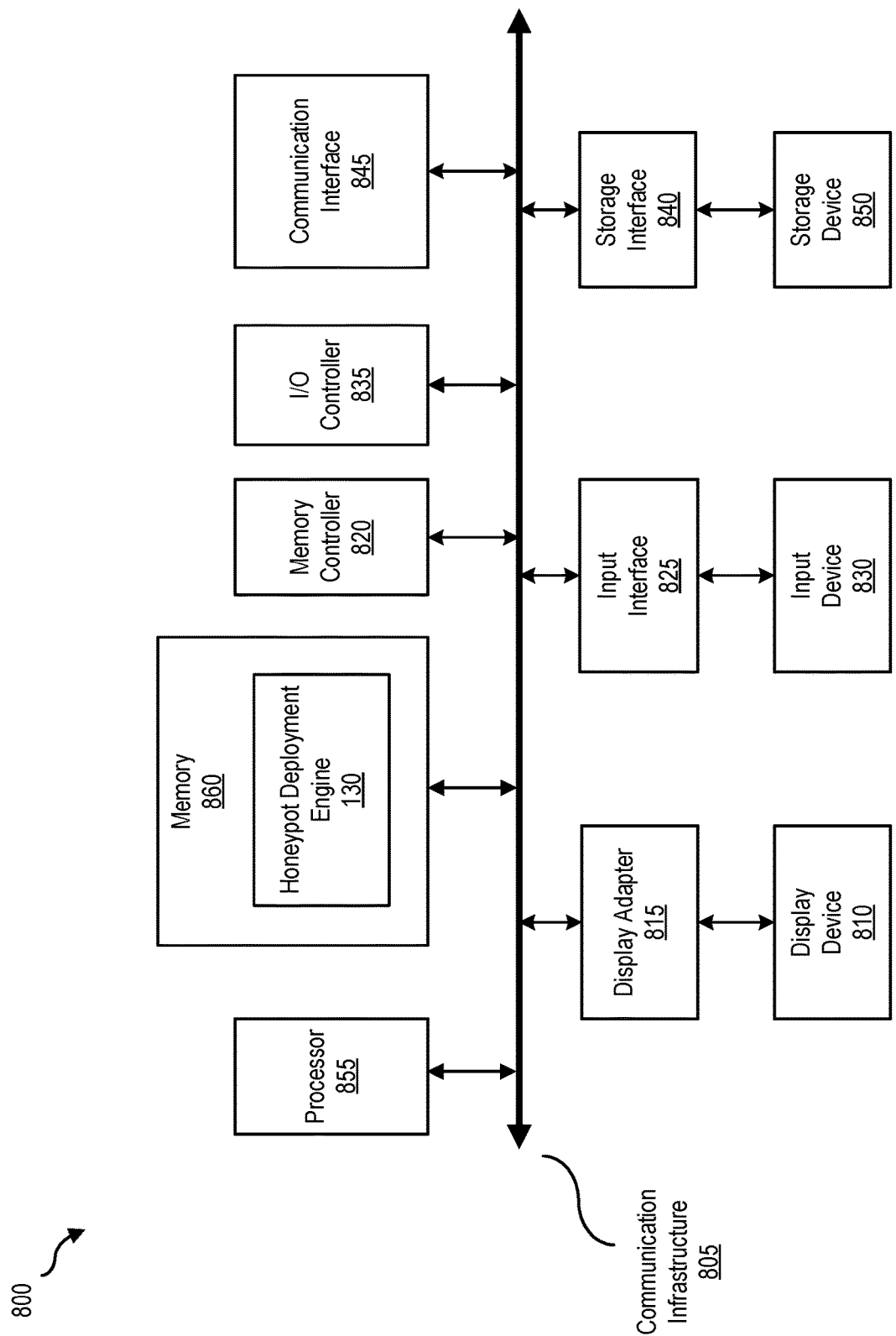
FIG. 8 is a block diagram 800 of a computing system, illustrating how a honeypot deployment engine can be implemented in software, according to one embodiment of the present disclosure.

FIG. 8 is a block diagram 800 of a computing system, illustrating how a honeypot deployment engine 130 can be implemented in software, according to one embodiment. Computing system 800 can include penetration testing computing device 105 or penetration testing server 305 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes honeypot deployment engine 130, computing system 800 becomes a special purpose computing device that is configured to perform and/or facilitate live deployment of deception computing systems, for example, in cybersecurity computing environments.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 800 may include both a volatile memory unit and a non-volatile storage device. In one example, program instructions implementing honeypot deployment engine 130 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein. I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type/form of communication device/adapter capable of facilitating communication between computing system 800 and other devices and may facilitate communication between computing system 800 and a private or public network. Examples of communication interface 845 include, a wired network interface (e.g., network interface card), a wireless network interface (e.g., a wireless network interface card), a modem, and any other suitable interface. Communication interface 845 may provide a direct connection to a remote server via a direct link to a network, such as the Internet, and may also indirectly provide such a connection through, for example, a local area network. Communication interface 845 may also represent a host adapter configured to facilitate communication between computing system 800 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 800 may also include at least one display device 810 coupled to communication infrastructure 805 via a display adapter 815 that generally represents any type or form of device capable of visually displaying information forwarded by display adapter 815. Display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850. When executed by processor 855, a computer program loaded into computing system 800 may cause processor 855 to perform and/or be a means for performing the functions of one or more of the embodiments described/illustrated herein. Alternatively, one or more of the embodiments described and/or illustrated herein may be implemented in firmware and/or hardware.

Example Networking Environment

Figure 9:
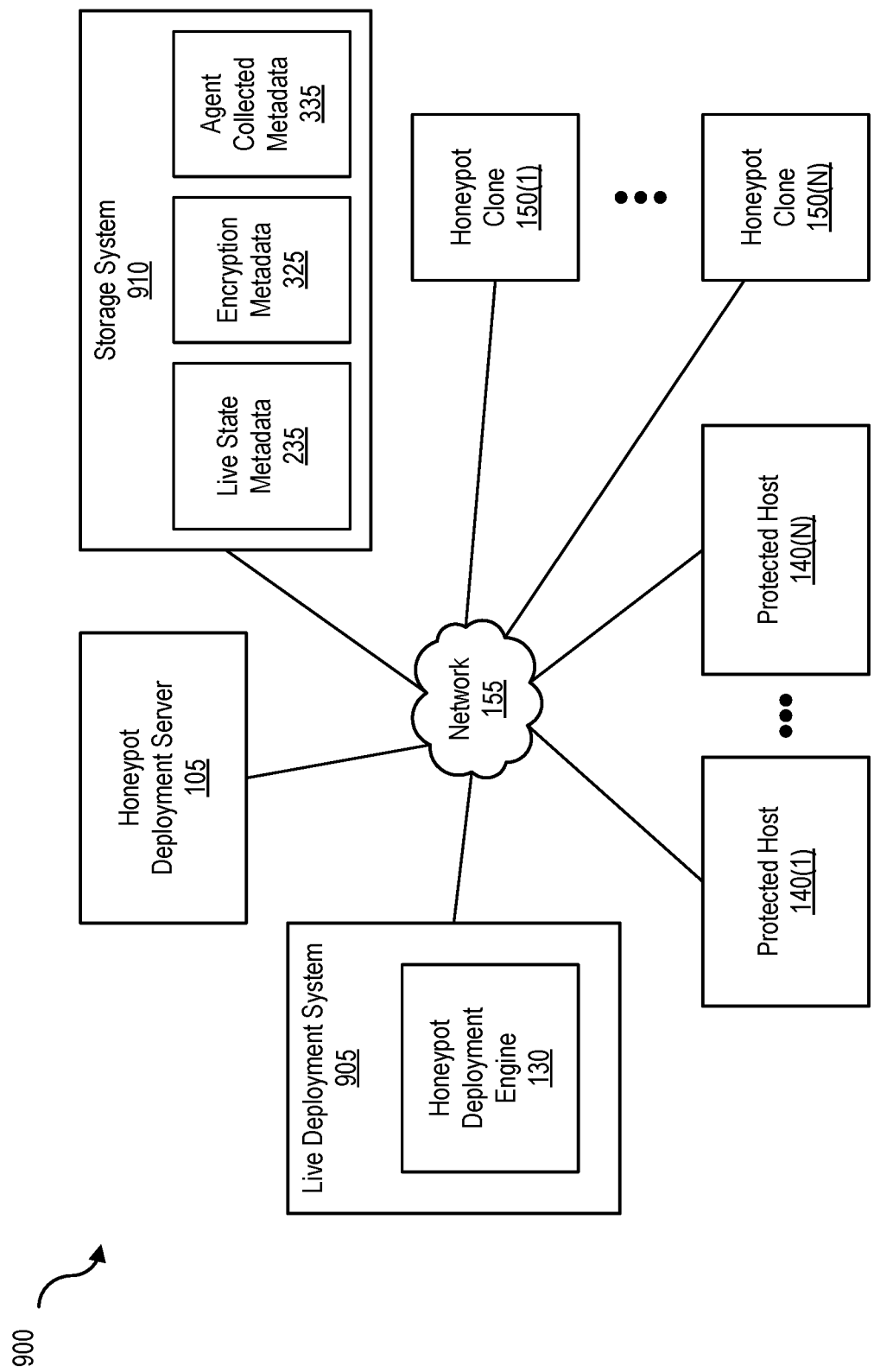
FIG. 9 is a block diagram 900 of a networked system, illustrating how various devices can communicate via a network, according to one embodiment of the present disclosure.

FIG. 9 is a block diagram of a networked system, illustrating how various computing devices can communicate via a network, according to one embodiment. Network 155 generally represents any type or form of computer network or architecture capable of facilitating communication between honeypot deployment server 105, honeypot clones 150(1)-(N), and/or live deployment system 905. For example, network 155 can be a Wide Area Network (WAN) (e.g., the Internet) or a Local Area Network (LAN).

In certain embodiments, a communication interface, such as communication interface 845 in FIG. 8, may be used to provide connectivity between honeypot deployment server 105, honeypot clones 150(1)-(N), and/or live deployment system 905, and network 155. The embodiments described and/or illustrated herein are not limited to the Internet or any particular network-based environment.

In some embodiments, live deployment system 905 may be part of honeypot deployment server 105 or one or more of honeypot clones 150(1)-(N), or may be separate. If separate, live deployment system 905 and honeypot deployment server 105 or honeypot clones 150(1)-(N) may be communicatively coupled via network 155. In one embodiment, all or a portion of one or more of the disclosed embodiments may be encoded as a computer program and loaded onto and executed by honeypot deployment server 105, honeypot clones 150(1)-(N), and/or live deployment system 905, or any combination thereof, and may be stored on storage system 910, honeypot deployment server 105, one or more of honeypot clones 150(1)-(N), and/or live deployment system 905, and distributed over network 155.

In some examples, all or a portion of honeypot deployment server 105, honeypot clones 150(1)-(N), and/or live deployment system 905 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, honeypot deployment engine 130 may transform the behavior of honeypot deployment server 105, honeypot clones 150(1)-(N), and/or live deployment system 905 to perform live deployment of deception systems.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
   detecting that a malicious attack on a protected host in a network is imminent or ongoing;
   cloning a plurality of personality characteristics of the protected host in response to the detecting that the malicious attack is imminent or ongoing;
   generating a honeypot clone based on the plurality of personality characteristics;
   deploying the honeypot clone in the network;
   determining that the malicious attack comprises an interactive session between an attacker associated with the malicious attack and the protected host; and
   performing a live state transition between the protected host and the honeypot clone using agent data if the interactive session comprises an encrypted protocol or using session state data if the interactive session does not comprise the encrypted protocol.

2. The computer-implemented method of claim 1, further comprising:
   redirecting attacker data traffic associated with the malicious attack from the protected host to the honeypot clone;
   disabling the protected host or access to the protected host; and
   resuming the interactive session if the redirection of the attacker traffic data transitions within a predetermined time period.

3. A non-transitory computer readable storage medium comprising program instructions executable to:
   detect that a malicious attack on a protected host in a network is imminent or ongoing;
   clone a plurality of personality characteristics of the protected host in response to the detecting that the malicious attack is imminent or ongoing;
   generate a honeypot clone based on the plurality of personality characteristics; and
   deploy the honeypot clone in the network;
   determine that the malicious attack comprises an interactive session between an attacker associated with the malicious attack and the protected host;
   perform a live state transition between the protected host and the honeypot clone using agent data if the interactive session comprises an encrypted protocol or using session state data if the interactive session does not comprise the encrypted protocol;
   redirecting attacker data traffic associated with the malicious attack from the protected host to the honeypot clone; and
   resuming the interactive session if the redirection of the attacker traffic data transitions within a predetermined time period.

4. A system comprising:
   one or more processors; and
   a memory coupled to the one or more processors, wherein the memory stores program instructions executable by the one or more processors to:
   detect that a malicious attack on a protected host in a network is imminent or ongoing;
   clone a plurality of personality characteristics of the protected host in response to the detecting that the malicious attack is imminent or ongoing;

generate a honeypot clone based on the plurality of personality characteristics;
deploy the honeypot clone in the network;
determine that the malicious attack comprises an interactive session between an attacker associated with the malicious attack and the protected host;
perform a live state transition between the protected host and the honeypot clone using agent data if the interactive session comprises an encrypted protocol or using session state data if the interactive session does not comprise the encrypted protocol;
redirecting attacker data traffic associated with the malicious attack from the protected host to the honeypot clone; and
resuming the interactive session if the redirection of the attacker traffic data transitions within a predetermined time period.

\* \* \* \* \*